US009000298B2

(12) United States Patent
Byrne et al.

(10) Patent No.: US 9,000,298 B2
(45) Date of Patent: Apr. 7, 2015

(54) INTERCHANGEABLE COVER SYSTEM (71) Applicants: Norman R. Byrne, Ada, MI (US);
Daniel P. Byrne, Lowell, MI (US);
Randell E. Pate, Jenison, MI (US)

(72) Inventors: Norman R. Byrne, Ada, MI (US);
Daniel P. Byrne, Lowell, MI (US);
Randell E. Pate, Jenison, MI (US)

( * ) Notice: Subject to any disclaimer, the term of this patent is extended or adjusted under 35 U.S.C. 154(b) by 0 days.

(21) Appl. No.: 14/261,597

(22) Filed: Apr. 25, 2014

(65) Prior Publication Data
US 2014/0326726 A1 Nov. 6, 2014

Related U.S. Application Data

(60) Provisional application No. 61/818,619, filed on May 2, 2013.

(51) Int. Cl.
*H05K 5/03* (2006.01)
*H02G 3/08* (2006.01)

(52) U.S. Cl.
CPC .................................. *H02G 3/081* (2013.01)

(58) Field of Classification Search
USPC ................ 174/66, 67; 220/241, 242; 439/136
See application file for complete search history.

(56) References Cited

U.S. PATENT DOCUMENTS

| | | | |
|---|---|---|---|
| 2,934,590 A * | 4/1960 | Thompson et al. | 174/53 |
| 3,953,933 A | 5/1976 | Goldstein | |
| 4,733,330 A * | 3/1988 | Tanaka et al. | 361/641 |
| 5,195,288 A | 3/1993 | Penczak | |
| 6,283,787 B1 | 9/2001 | Chou | |
| 6,379,182 B1 | 4/2002 | Byrne | |
| 6,717,053 B2 | 4/2004 | Rupert | |
| 6,885,796 B2 | 4/2005 | Lubkert et al. | |
| 6,940,015 B2 | 9/2005 | Fang | |
| 6,971,911 B2 | 12/2005 | Ramsey et al. | |
| 7,053,296 B2 | 5/2006 | Drane et al. | |
| 7,179,996 B1 * | 2/2007 | Britt et al. | 174/66 |
| 7,611,364 B2 * | 11/2009 | Kidman | 439/136 |
| 7,736,178 B2 | 6/2010 | Byrne | |
| 7,806,723 B2 | 10/2010 | Chong et al. | |
| 7,989,738 B2 | 8/2011 | Byrne | |
| 8,295,036 B2 | 10/2012 | Byrne | |
| 8,592,681 B2 * | 11/2013 | Alderson et al. | 174/66 |
| 8,721,124 B2 | 5/2014 | Byrne et al. | |

(Continued)

FOREIGN PATENT DOCUMENTS

| | | |
|---|---|---|
| JP | 8-31345 | 3/1996 |
| JP | 2006-204045 | 8/2006 |
| KR | 20-0175558 | 4/2000 |

OTHER PUBLICATIONS

PCT International Search Report and Written Opinion for Corresponding PCT Application No. PCT/US2014/035424 dated Sep. 3, 2014.

*Primary Examiner* — Dhirubhai R Patel
(74) *Attorney, Agent, or Firm* — Gardner, Linn, Burkhart & Flory, LLP (57) ABSTRACT

An interchangeable cover system is provided for use with an electrical power or data unit, such as at or near a work surface. The cover system includes an aesthetic cover and a clip member. The aesthetic cover has an aesthetic surface and an attachment surface, which is opposite the aesthetic surface. The clip member is positioned at the attachment surface of the aesthetic cover, and is used to releasably secure the aesthetic cover to a housing of the electrical power unit. In one embodiment, the clip member includes a pair of resilient projections with hook-like portions for releasably engaging an opening formed in the housing of the power unit.

20 Claims, 7 Drawing Sheets

(56) References Cited

U.S. PATENT DOCUMENTS

2003/0186582 A1 10/2003 Laukhuf et al.
2006/0258195 A1 11/2006 Schwartz et al.
2012/0175233 A1 7/2012 Yu
2012/0200989 A1 8/2012 Byrne et al.
2012/0289081 A1 11/2012 Izzard

* cited by examiner

INTERCHANGEABLE COVER SYSTEM

CROSS REFERENCE TO RELATED APPLICATION

The current application claims the benefit of U.S. provisional application Ser. No. 61/818,619, filed May 2, 2013, which is hereby incorporated herein by reference in its entirety.

FIELD OF THE INVENTION

The present invention relates to decorative, aesthetic, or functional covers, particularly for use on electrical power modules or units associated with work surfaces or the like.

BACKGROUND OF THE INVENTION

Electrical power units and other devices are commonly located at or near work surfaces, such as tables, desks, wall panels, and the like. Such power units and devices are typically manufactured with an outer housing that remains fixed and unchanged for the life of the product.

SUMMARY OF THE INVENTION

The present invention provides an interchangeable cover system for use on electrical power modules or the like, which may be positioned at or along work surfaces, in work areas, or other places where access to electrical power is commonly provided. The cover system permits the outer appearance of an electrical power module to be changed or customized by users, typically without need for tools, disassembly of the power module, or disconnecting power.

According to one form of the present invention, an interchangeable cover system is adapted for use on an electrical power unit, and includes an aesthetic cover and a clip member. The aesthetic cover has an aesthetic surface and an attachment surface, opposite the aesthetic surface. The clip member is positioned at the attachment surface of the aesthetic cover, and is configured to releasably secure the aesthetic cover to a housing of the electrical power unit.

In one aspect, the clip member has an outer surface that is coupled to the attachment surface of the aesthetic cover via at least one chosen from (i) an adhesive, (ii) an ultrasonic weld, (iii) a heat weld, (iv) a mechanical fastener, (v) a hook-and-loop fastener, and (vi) a magnetic fastener. However, it would further be an option that the clip member and said aesthetic cover are unitarily formed.

In another aspect, the clip member includes a projection that engages an opening formed in a surface of the housing of the electrical power unit. The projection may be a resilient projection, and the clip member may include at least two of such projections.

According to another form of the present invention, an interchangeable cover system is provided for use on an electrical power unit. The system includes an aesthetic cover and a clip member with a pair of spaced-apart projections. The cover has an aesthetic surface and an attachment surface opposite the aesthetic surface, and the clip member is disposed at the attachment surface of the aesthetic cover. The clip member releasably secures the aesthetic cover to a housing of the electrical power unit, with the spaced-apart projections configured to be received in an opening formed in a surface of the housing of the electrical power unit. The projections are compressible toward one another during insertion of the resilient projections into the opening formed in the surface of the housing, and the projections engage the housing at respective opposite ends of the opening formed in the housing surface.

In one aspect, a generally V-shaped space is defined between each pair of projections, and the projections further include a hook-like portion extending laterally outwardly for engaging respective portions of the housing that form the opposite ends of the opening.

In another aspect, the cover system is combined with the electrical power unit, which includes at least one electrical outlet.

In yet another aspect, the surface of the electrical power unit's housing includes a recessed region defined around the opening. The recessed region is configured to receive a portion of the clip member upon engagement of the clip member's projections in the opening.

In still another aspect, a coupling element (such as an adhesive material) is disposed between the inner attachment surface of the aesthetic cover and the outer surface of the clip member. The coupling element secures the clip member to the attachment surface of the aesthetic cover.

In a further aspect, the electrical power unit includes a clamp member for securing the electrical power unit to a work surface.

Optionally, the aesthetic surface of the aesthetic cover includes at least one chosen from (i) a patterned or textured surface, (ii) a soft material such as felt, cork, rubber, or rubber-like material, and (iii) indicia.

According to another form of the present invention, an electrical power unit includes a replaceable aesthetic cover. The power unit includes a housing and at least one electrical outlet, while the aesthetic cover has an associated plurality of clip members for securing it to the power unit housing. The power unit housing has an outer surface to which the cover is mounted, the outer surface defining a plurality of openings that are engaged by the clip members. The aesthetic cover has an outer aesthetic surface and an inner attachment surface, and coupling elements attach the aesthetic cover to the clip members. Each of the clip members has an outer surface that is securable to the inner attachment surface of the aesthetic cover, an inner surface opposite the outer surface, and a pair of resilient projections extending from the inner surface and defining a generally V-shaped space therebetween. Each of the resilient projections further includes a hook-like portion extending laterally outwardly to releasably engage the housing at respective opposite ends of one of the openings formed in the housing. The coupling element is disposed between the inner attachment surface of the aesthetic cover and the outer surface of the clip member, and is configured to secure the clip member to the aesthetic cover. The resilient projections are compressible toward one another during insertion of the resilient projections into the opening formed in the surface of the housing.

In one aspect, the housing includes a pair of ramped surfaces located adjacent the opposite ends of the openings. The ramped surfaces are engaged by the hook-like portions of the resilient projections upon full engagement of the clip members in the openings.

In a further aspect, the outer surface of the electrical power unit housing includes a recessed region defined around each of the openings. The recessed regions receive a generally planar portion of the clip member upon engagement of the projections in the corresponding openings.

In another aspect, the outer surface of the electrical power unit housing includes a cover-receiving surface surrounded by a raised perimeter lip. The cover-receiving surface is configured to receive the aesthetic cover, whereby the outer aesthetic surface of the aesthetic cover is substantially flush with the raised perimeter lip. Optionally, the cover-receiving surface is spaced a first distance below the raised perimeter lip and the recessed regions defined around the openings are recessed a second distance below the raised perimeter lip that is greater than the first distance.

Thus, the interchangeable cover system of the present invention provides for a wide range of appearance options for electrical power and/or data units or the like, allowing them to be customized for a particular customer or other user, and allowing for at least an aesthetic refurbishment of the unit by replacing an aesthetic cover that is no longer desirable, with a new or different cover that is preferred, and substantially without the use of tools or requiring technical expertise or safety precautions such as disconnecting power.

These and other objects, advantages, purposes and features of the present invention will become apparent upon review of the following specification in conjunction with the drawings.

DESCRIPTION OF THE PREFERRED EMBODIMENTS

An interchangeable cover system is provided for creating a desired aesthetic appearance of an electrical power and/or data unit in a work area or the like. In some cases, the interchangeable cover system may be adapted for use on other surfaces, such as surfaces of table grommets or other surfaces typically found in a work area. The cover system includes one or more covers or plates, which provide a desired appearance, or even a desired function, at the electrical power and/or data unit, which is separate from the primary function(s) provided by the unit (e.g., high voltage power supply, low voltage power supply, data outlets, etc.).

Figure 1:
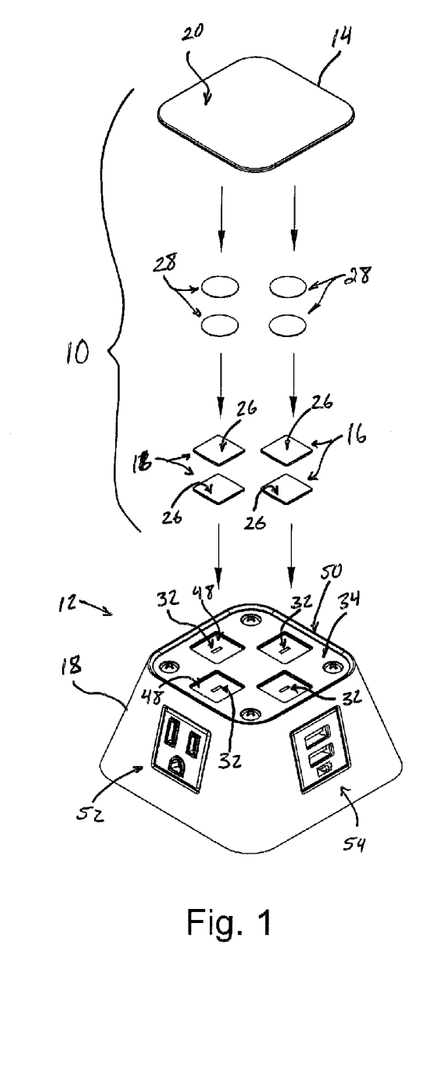
FIG. 1 is an exploded top perspective view of an interchangeable cover system in accordance with the present invention.

Referring now to the drawings and the illustrative embodiments depicted therein, an interchangeable cover system 10 is primarily intended for use at an electrical power and/or data unit 12 (hereinafter "electrical power unit"), which is adapted for use at, along, or near a work surface such as a table, desk, partition wall, or the like (FIG. 1). Cover system 10 includes an aesthetic cover 14 and a clip member 16, the clip member 16 being configured for releasable engagement with a housing 18 of electrical power unit 12, as will be described below.

Figure 2:
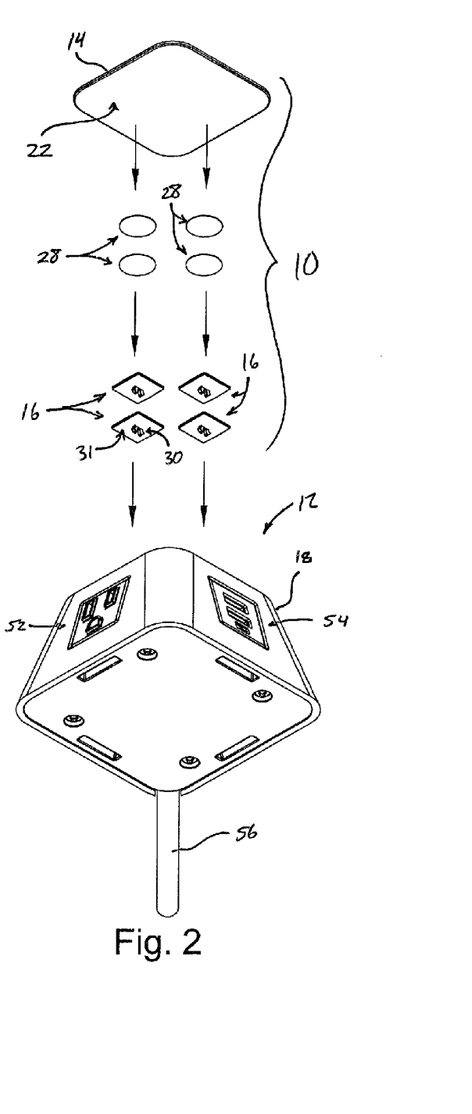
FIG. 2 is an exploded bottom perspective view of the interchangeable cover system of FIG. 1.
Figure 3:
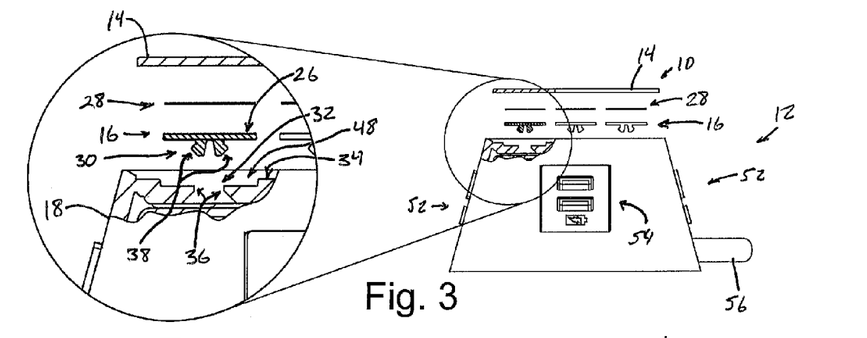
FIG. 3 is an exploded side elevation of the interchangeable cover system of FIG. 1, including an enlarged region to show detail, in which a corner portion of the electrical power unit is broken away to show internal structure.
Figure 4:
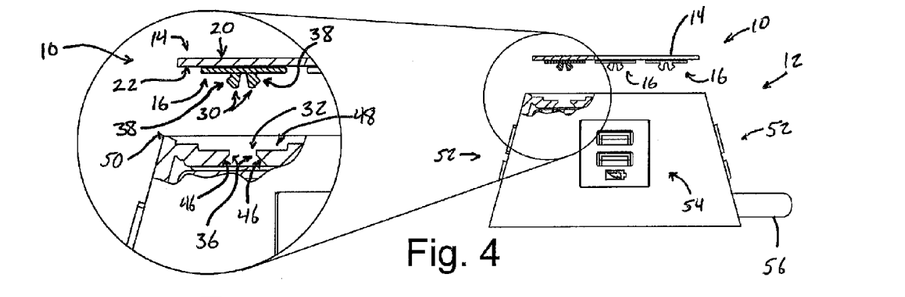
FIG. 4 is another side elevation of the interchangeable cover system of FIG. 1, including an enlarged region to show detail, in which clips have been attached to an underside of the aesthetic cover.

Aesthetic cover 14 may be substantially planar, such as shown in FIGS. 1-7 and 18A-29, and has an aesthetic surface 20 and an attachment surface 22 opposite the aesthetic surface 20 (FIGS. 1-3). Clip members 16 are attached to attachment surface 22 of the aesthetic cover 14, and are used to releasably secure the aesthetic cover 14 to housing 18 of the electrical power unit 12. In the illustrated embodiment, each clip member 16 includes an outer surface 26 that is coupled to the attachment surface 22 of the aesthetic cover 14 by a respective piece of double-sided adhesive tape 28. However, it is envisioned that clip member 16 may optionally be attached or coupled to aesthetic cover via a cured adhesive, a heat weld (such as an ultrasonic weld, friction weld, or the like), a mechanical fastener (such as a clip, screw, magnet, hook-and-loop fastener, or the like), or substantially any other suitable attachment method or device. Clip members 16 may be readily replaceable along attachment surface 22, such as by breaking an adhesive bond. It is further envisioned that the aesthetic cover could be unitarily formed with one or more clip members, such that the clip members (or portions thereof) project outwardly directly from the attachment surface of the aesthetic cover, without departing from the spirit and scope of the present invention.

Figure 5:
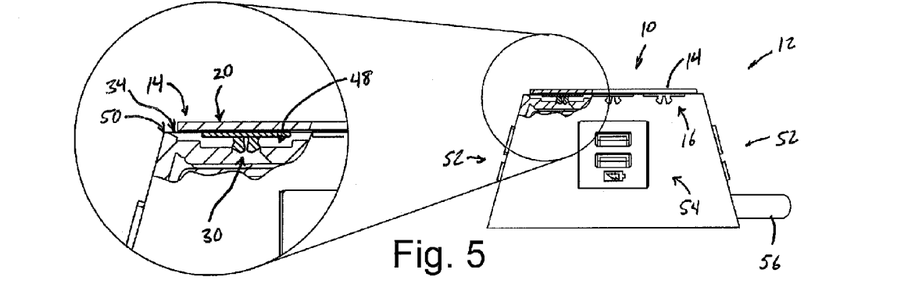
FIG. 5 is another side elevation of the interchangeable cover system of FIG. 1, including an enlarged region to show detail, in which the clips are initially engaged in slots at the upper surface of the electrical power unit.
Figure 22:
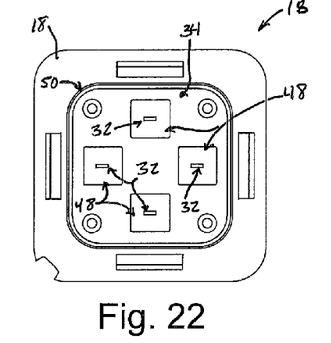
FIG. 22 is a top plan view of the electrical power unit housing of FIG. 19.
Figure 23:
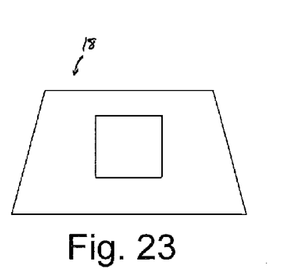
FIG. 23 is a right side elevation of the electrical power unit housing of FIG. 19.
Figure 24:
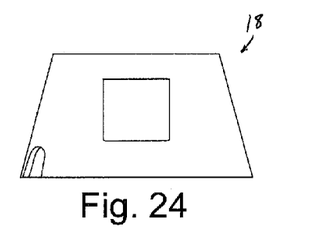
FIG. 24 is a rear elevation of the electrical power unit housing of FIG. 19.
Figure 25:
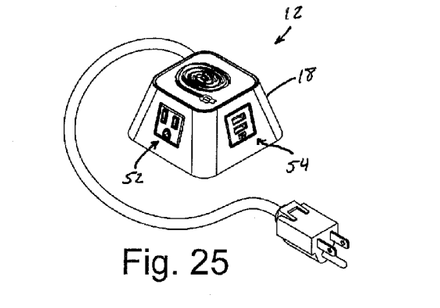
FIG. 25 is a top perspective view of the electrical power unit of FIG. 7, shown fitted with a different aesthetic cover.

Each clip member 16 includes a pair of resilient projections 30 extending outwardly from a housing-engaging surface 31 that is located opposite outer surface 26, such as shown in FIGS. 9-11, 12, 14, and 16. Projections 30 are configured to engage the electrical power unit's housing 18 at an opening 32 formed in a cover-receiving surface or portion 34 thereof, such as in the manner shown in FIGS. 5 and 6, which will be described below in more detail. Opening 32 is generally rectangular in shape when viewed from above, such as shown in FIGS. 1 and 22, and includes opposite ends 36 (FIGS. 3-6) that are contacted by respective outboard surfaces 38 of resilient projections 30 during installation and attachment of cover system 10 to electrical power unit 12 (FIGS. 5 and 6).

Figure 10:
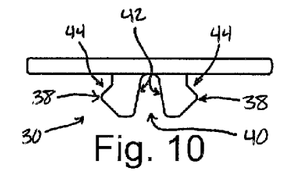
FIG. 10 is front elevation of the clip of FIG. 8.
Figure 11:
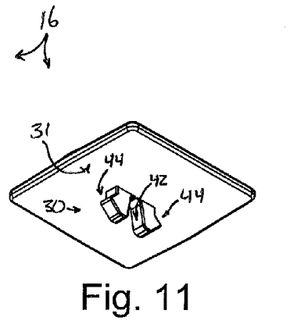
FIG. 11 is another bottom perspective view of the clip of FIG. 8.
Figure 12:
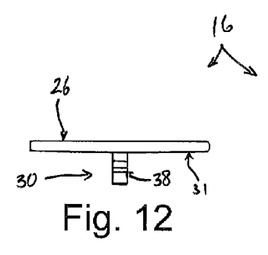
FIG. 12 is a left side elevation of the clip of FIG. 8.
Figure 13:
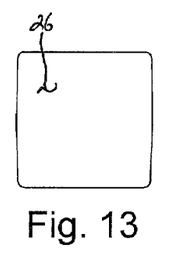
FIG. 13 is a top plan view of the clip of FIG. 8.
Figure 14:
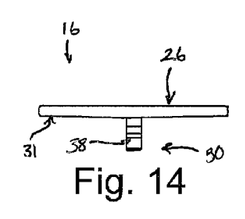
FIG. 14 is a right side elevation of the clip of FIG. 8.
Figure 15:
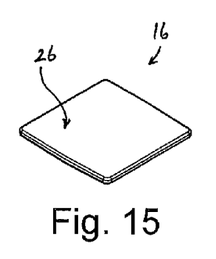
FIG. 15 is a top perspective view of the clip of FIG. 8.
Figure 16:
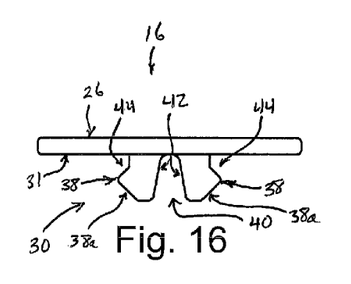
FIG. 16 is a rear elevation of the clip of FIG. 8.
Figure 17:
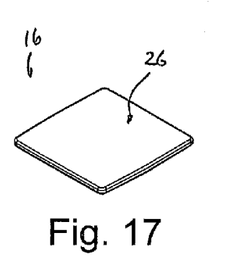
FIG. 17 is another top perspective view of the clip of FIG. 8.

Resilient projections 30 define a generally V-shaped space 40 between respective inner surfaces 42, which are generally opposite outboard surfaces 38, such as shown in FIGS. 10 and 16. Each resilient projection 30 includes a hook-like portion 44 that extends laterally outwardly for engagement with a respective ramped surface 46 of the housing 18 at opening 32, such as shown in FIG. 6. Outboard surfaces 38 include leading or distal ramped surfaces 38a (FIGS. 10 and 16) that engage opposite ends 36 defining opening 32 during initial engagement of projections 30 with opening 32 formed in cover-receiving surface 34 of housing 18, such as shown in FIG. 5. Resilient projections 30 are compressible toward one another (FIG. 5) during insertion of the resilient projections into opening 32 formed in cover-receiving surface 34 of housing 18, as distal ramped surfaces 38a engage and slide along the respective opposite ends 36 that define respective portions of opening 32 in housing 18. However, it is envisioned that projections 30 could be made substantially rigid, with the opening's opposite ends 36 formed by resilient areas of cover-receiving surface 34, so that opening 32 would be enlarged during insertion of projections 30.

Figure 6:
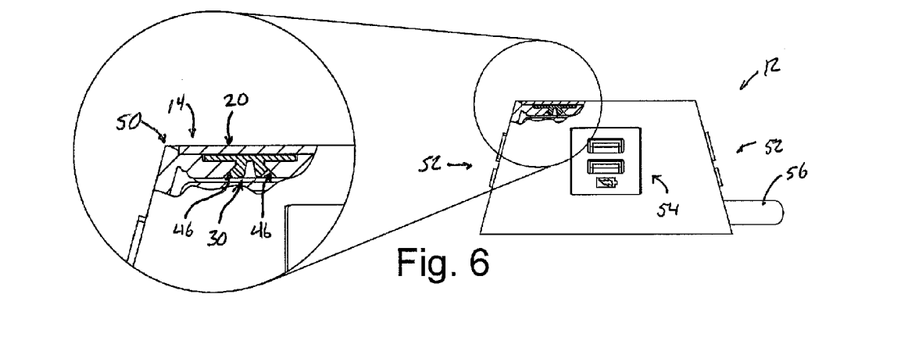
FIG. 6 is another side elevation of the interchangeable cover system of FIG. 1, including an enlarged region to show detail, in which the clips are fully engaged in the slots at the upper surface of the electrical power unit.
Figure 7:
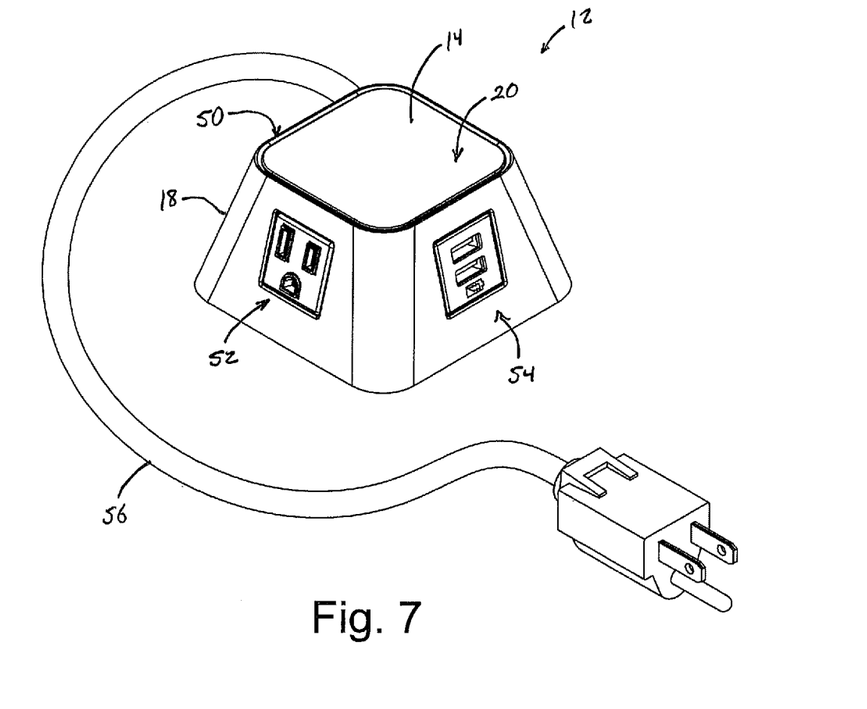
FIG. 7 is a top perspective view of the electrical power unit with cover system installed.
Figure 8:
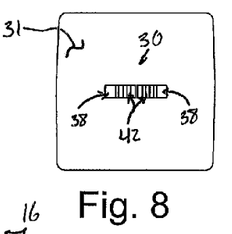
FIG. 8 is a bottom plan view of a clip of the interchangeable cover system.
Figure 9:
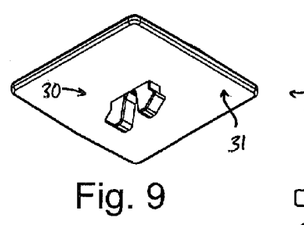
FIG. 9 is a bottom perspective view of the clip of FIG. 8.

Openings 32 may be formed or established in respective recessed portions 48 of cover-receiving surface 34, such as shown in FIGS. 1, 3-6, and 22. Recessed portions or regions 48 may be sized and shaped (both in lateral dimensions and in depth) to receive the generally planar portion of clip member 16 that forms outer surface 26 and housing-engaging surface 31, such as shown in FIGS. 3-6. All of cover-receiving surface 34 (or a substantial portion thereof) may be recessed below a perimeter lip 50 formed by housing 18, so that aesthetic cover 14 is received along cover-receiving surface 34 with aesthetic surface 20 being substantially flush with perimeter lip 50, such as shown in FIG. 6.

Interchangeable cover system 10 may be removably coupled to electrical power unit 12 in the manner generally illustrated at FIGS. 3-6, for example, in which aesthetic cover 14, double-sided tape 28, and clip members 16 are initially separate (FIG. 3) and then are joined together to form a single cover unit (FIG. 4) that is ready to be attached to housing 18. The cover unit is aligned with cover-receiving surface 34 of housing 18 and moved closer so as to engage pairs of projections 30 in respective openings 32 (FIG. 5), at which point an additional force is applied to aesthetic surface 20 of the aesthetic cover 14 of cover system 10, to thereby snap projections 30 fully into engagement with the surfaces 36, 46 defining opening 32, such as shown in FIG. 6.

While it is envisioned that this installation procedure would normally be performed by hand, a mallet or other tool may be used to facilitate for installation. It is further envisioned that clip members 16 could initially be individually or simultaneously engaged with the respective openings 32 in cover-receiving surface 34 of housing 18, after which double-sided tape 28 (or other adhesive or fastener) could be applied to outer surfaces 26 (or exposed along the outer surfaces 26), so that aesthetic cover 14 may be positioned against the tape 28 or adhesive to secure the cover 14 at housing 18. To remove cover system 10, a thin tool such as a screwdriver or knife blade, fingernail, etc. may be inserted between a perimeter edge of aesthetic cover 14 and perimeter lip 50 (and/or surface 34), and used to pry cover system 10 away from housing 18. A recess may be provided along the perimeter edge of cover 14 to facilitate removal by that method.

Figure 18A:
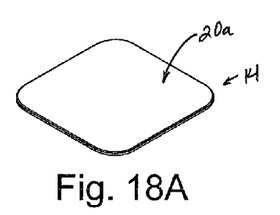
FIGS. 18A-18I are top perspective views of various aesthetic covers of the interchangeable cover system.
Figure 18B:
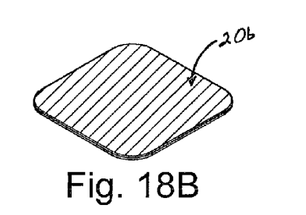
Figure 18C:
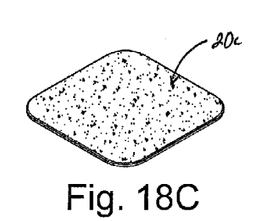
Figure 18D:
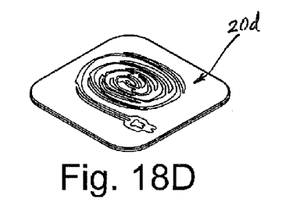
Figure 18E:
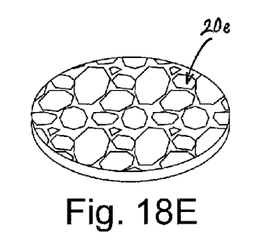
Figure 18F:
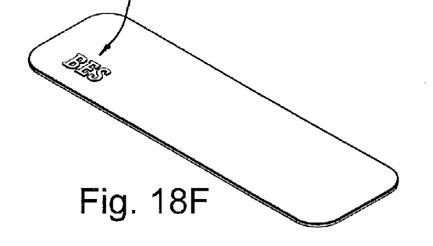
Figure 26:
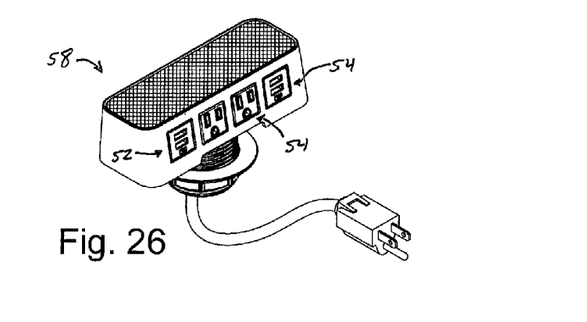
FIG. 26 is a top perspective view of another electrical power unit fitted with another aesthetic cover.
Figure 27:
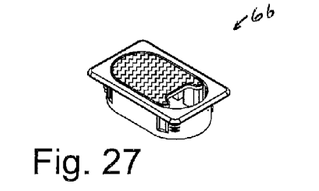
FIG. 27 is a top perspective view of a grommet fitted with another aesthetic cover.
Figure 28:
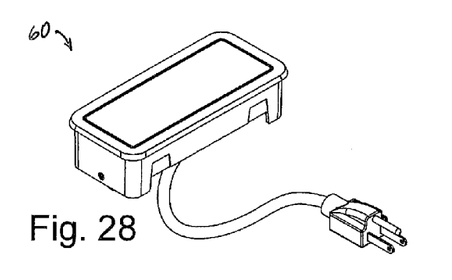
FIG. 28 is a top perspective view of another electrical power unit fitted with another aesthetic cover.
Figure 29:
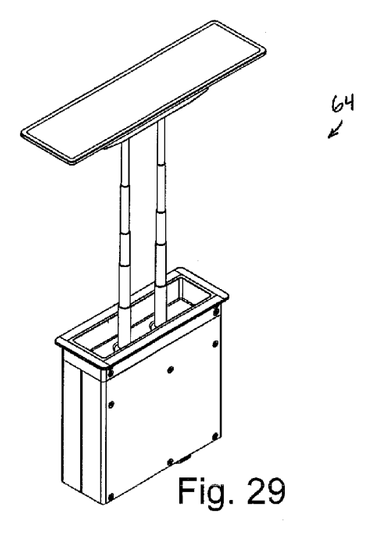
FIG. 29 is a top perspective view of a lamp assembly fitted with another aesthetic cover.
Figure 30:
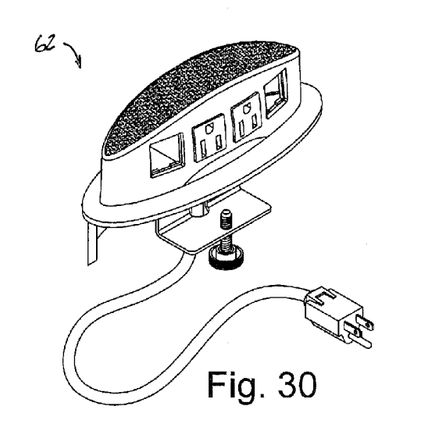
FIG. 30 is a top perspective view of another electrical power unit fitted with another aesthetic cover.

Aesthetic surface 20 of cover 14 may be a substantially smooth surface having a solid color appearance 20a (FIG. 18A), or may have a textured appearance such as striped 20b (FIG. 18B) or speckled 20c (FIG. 18C) or other surface texture (such as shown in FIGS. 26, 27, and 30), or may have a printed logo 20d (FIG. 18D) or other indicia or image such as a stone-like image 20e as shown in FIG. 18E, lettering 20f (FIG. 18F), foliage 20g (FIG. 18G), an outline 20h (FIG. 18H), or the appearance of a printed circuit board 20i (FIG. 18I), for example. Attachment surface 22 may be generally smooth or somewhat textured, and its material (which may be the same material as substantially the rest of aesthetic cover 14) and texture may be selected according to the type of coupling or joining device or method used to secure aesthetic cover 14 to clip members 16.

Figure 18G:
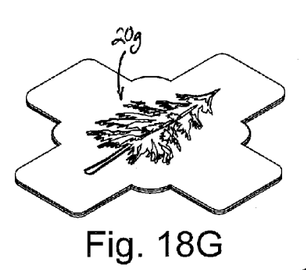
Figure 18H:
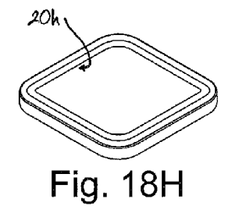
Figure 18I:
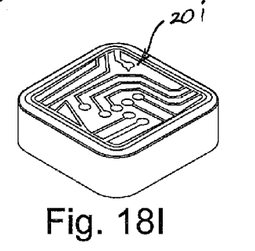
Figure 19:
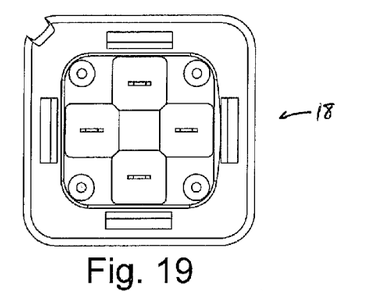
FIG. 19 is a bottom plan view of an electrical power unit housing that is configured to receive the interchangeable cover system.
Figure 20:
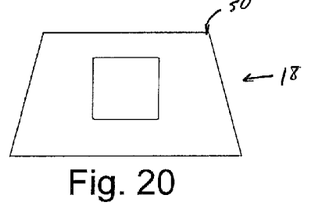
FIG. 20 is a front elevation of the electrical power unit housing of FIG. 19.
Figure 21:
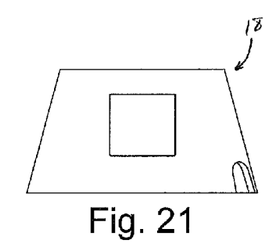
FIG. 21 is a left side elevation of the electrical power unit housing of FIG. 19.

It will further be appreciated that aesthetic covers 14 may be made in substantially any shape, such as generally square (FIGS. 1, 2, 7, 18A-18D, 18H, 18I, and 25), generally rectangular (FIGS. 18F, 26, 28, and 29), circular or rounded or elliptical shapes (FIGS. 18E, 27, and 30), or other shapes such as generally cruciform (FIG. 18G). It will be appreciated that the shape of the aesthetic cover 14 may be chosen or formed (e.g. die-cut, laser-cut, milled, molded, etc.) to fit substantially any shape of surface, including non-planar surfaces such as shown in FIG. 30. In addition, the upper or aesthetic surface may provide at least limited function for users having access to the electrical power unit 12. For example, it is envisioned that a felt pad, a cork pad, a rubber or rubber-like pad, or even a low-voltage charging pad may be incorporated into (or attached to) the aesthetic surface 20, such as in the manners that are more fully described in co-pending and commonly-owned U.S. patent application Ser. No. 14/385,008, filed Jan. 27, 2012 (U.S. Publication No. 2012/0200989), which is hereby incorporated herein by reference in its entirety.

Electrical power unit 12 may include one or more high voltage power outlets 52, which may be configured as simplex receptacles (shown) or the like, and/or one or more low voltage power outlets 54, which may be configured as USB-type power outlets (shown) or substantially any other low voltage (typically DC) outlet or receptacle, such as shown in FIGS. 1 and 2. In the illustrated embodiment of FIGS. 1-4 and 7, electrical power unit 12 includes two high voltage power outlets 52 and two low voltage power outlets 54, which are made accessible through generally rectangular or square openings formed in sidewalls of housing 18 (FIGS. 20-24). Electrical power unit 12 has a generally flat base or bottom, such as shown in FIG. 2, so that it can rest directly on a table, desk, or other generally horizontal support surface. A single high voltage power cord 56 supplies electrical power to outlets 52, 54, and an electrical transformer is used to supply low voltage electrical current to low voltage power outlets 54. Optionally, one or more data outlets, charging stations, electrical or electronic cabling, or the like may be provided at the electrical power unit.

Optionally, it is envisioned that the interchangeable cover system 10 may be configured for use with substantially any type of electrical power unit, such as a hole-mount power unit 58 (FIG. 26), a recessed pop-up unit 60 (FIG. 28), an edge-clamp unit 62 (FIG. 30), a light or lamp unit 64 (FIG. 29), or the like. Lamp unit 64 is more fully described in commonly-owned U.S. Pat. No. 8,721,124, issued May 13, 2014, which is hereby incorporated herein by reference in its entirety. Examples of other electrical power units with which interchangeable cover system 10 would be compatible include, for example, commonly-owned U.S. Pat. No. 8,295,036, U.S. Pat. No. 7,989,738, and U.S. Pat. No. 6,379,182, all of which are hereby incorporated herein by reference in their entireties. It is further envisioned that the interchangeable cover system 10 may be applied to non-electrified devices or articles, such as work table grommets 66 (FIG. 27) or the like.

Accordingly, the interchangeable cover system of the present invention provides for a customizable appearance and/or added function for an electrical power and/or data unit that is used in a work area or the like. The cover system includes an aesthetic cover that may be selected from a virtually limitless number of colors, patterns, textures, surface materials, printed images or indicia, or the like, and can be readily (but removably) secured to a power unit using one or more clip members that are configured to engage a cover-receiving surface of the power unit housing.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power unit comprising:
an electrical power unit housing having a cover-receiving surface that is recessed below and substantially surrounded by a raised perimeter lip, an opening defined in said cover-receiving surface, and a recessed region around said opening;
an aesthetic cover having an aesthetic surface and an attachment surface opposite said aesthetic surface;
a clip member disposed at said attachment surface of said aesthetic cover and configured to releasably secure said aesthetic cover to said electrical power unit housing, said clip member comprising a generally planar portion and a projection extending outwardly away from said generally planar portion, wherein said projection is configured to be received in said opening; and
wherein said recessed region is configured to receive said generally planar portion of said clip member upon engagement of said projection in said opening, whereupon said cover-receiving surface receives said aesthetic cover with said perimeter lip surrounding at least a portion of said aesthetic cover.

2. The electrical power unit of claim 1, wherein said clip member comprises an outer surface that is coupled to said attachment surface of said aesthetic cover.

3. The electrical power unit of claim 2, wherein said outer surface of said clip member is configured to be coupled to said attachment surface of said aesthetic cover via at least one chosen from (i) an adhesive, (ii) an ultrasonic weld, (iii) a heat weld, (iv) a mechanical fastener, (v) a hook-and-loop fastener, and (vi) a magnetic fastener.

4. The electrical power unit of claim 2, further comprising a double-sided adhesive configured to secure said outer surface of said aesthetic cover to said attachment surface of said aesthetic cover.

5. The electrical power unit of claim 1, wherein said clip member comprises a pair of said projections comprising a resilient material, wherein said pair of projections are spaced apart and are compressible toward one another during insertion of said pair of projections into said opening.

6. The electrical power unit of claim 5, wherein said pair of projections cooperate to define a generally V-shaped space therebetween, and wherein each of said projections comprises a hook-like portion extending laterally outwardly for releasable engagement with respective portions of said housing that form opposite ends of said opening.

7. The electrical power unit of claim 1, wherein said electrical power unit comprises at least one electrical outlet.

8. The electrical power unit of claim 1, wherein said cover-receiving surface is spaced a distance below said raised perimeter lip that is substantially equal to a thickness of said aesthetic cover, and said recessed region is recessed a distance below said cover-receiving surface that is substantially equal to a thickness of said generally planar portion of said clip member.

9. The electrical power unit of claim 1, wherein said aesthetic surface of said aesthetic cover comprises at least one chosen from (i) a patterned or textured surface, (ii) a felt, cork, rubber, or rubber-like material, and (iii) indicia.

10. An electrical power unit comprising:
an electrical power unit housing having a cover-receiving surface that is recessed below and substantially surrounded by a raised perimeter lip, a plurality of openings defined in said cover-receiving surface, and a recessed region around each of said openings;
an aesthetic cover having an outer aesthetic surface and an inner attachment surface;
a plurality of clip members each having (i) an outer surface that is securable to said inner attachment surface of said aesthetic cover, (ii) an inner surface opposite said outer surface, and (iii) a projection extending from said inner surface and configured to releasably engage a respective one of said openings; and
a coupling element disposed between said inner attachment surface of said aesthetic cover and said outer surface of said clip member, wherein said coupling element is configured to secure said clip member to said aesthetic cover;
wherein said recessed regions are configured to receive respective ones of said inner surfaces of said clip members upon engagement of said projections in said openings, whereupon said cover-receiving surface receives said aesthetic cover with said perimeter lip surrounding at least a portion of said aesthetic cover.

11. The electrical power unit of claim 10, wherein said coupling element comprises at least one chosen from (i) an adhesive, (ii) an ultrasonic weld, (iii) a heat weld, (iv) magnets, and (v) a mechanical fastener.

12. The electrical power unit of claim 10, wherein each of said clip members comprises a pair of said projections made of a resilient material, each of said pair of projections defining a generally V-shaped space therebetween, and wherein each of said projections comprises a hook-like portion extending laterally outwardly for engagement with a respective portion of said housing at one of said openings, and wherein said pairs of projections are compressible toward one another during insertion of said pairs of projections into respective ones of said openings.

13. The electrical power unit of claim 10, wherein said electrical power unit comprises at least one electrical outlet positioned at said housing below said cover-receiving surface.

14. The electrical power unit of claim 13, wherein said electrical power unit comprises a clamp member configured to secure said electrical power unit to a work surface.

15. The electrical power unit of claim 10, wherein said aesthetic surface of said aesthetic cover comprises at least one chosen from (i) a patterned or textured surface, (ii) a felt, cork, rubber, or rubber-like material, and (iii) indicia.

16. The electrical power unit of claim 10, wherein said cover-receiving surface is spaced a distance below said raised perimeter lip that is substantially equal to a thickness of said aesthetic cover, and said recessed region is recessed a distance below said cover-receiving surface that is substantially equal to a distance between said inner and outer surfaces of said clip member, and wherein said outer aesthetic surface of said aesthetic cover is substantially flush with said raised perimeter lip.

17. An electrical power unit comprising:
   an electrical power unit housing having a cover-receiving surface that is recessed below and substantially surrounded by a raised perimeter lip, a plurality of openings defined in said cover-receiving surface, and a recessed region around each of said openings;
   at least one electrical outlet disposed at said electrical power unit housing;
   at least one aesthetic cover having an outer aesthetic surface and an inner attachment surface, said aesthetic cover configured to be received and supported at said housing of said electrical power unit;
   a plurality of clip members each comprising:
      an outer surface that is securable to said inner attachment surface of said aesthetic cover;
      an inner surface opposite said outer surface; and
      a pair of resilient projections extending from said inner surface and defining a generally V-shaped space therebetween, each of said resilient projections having a hook-like portion extending laterally outwardly to releasably engage said housing at respective opposite ends of one of said openings formed therein;
   a coupling element disposed between said inner attachment surface of said aesthetic cover and said outer surface of said clip member, and configured to secure said clip member to said aesthetic cover;
   wherein said recessed regions are configured to receive respective ones of said inner surfaces of said clip members upon engagement of said projections in said openings, whereupon said cover-receiving surface receives said aesthetic cover with said perimeter lip surrounding at least a portion of said aesthetic cover; and
   wherein corresponding ones of said resilient projections are compressible toward one another during insertion of said resilient projections into respective ones of said openings.

18. The electrical power unit of claim 17, wherein said housing comprises a pair of ramped surfaces adjacent said opposite ends of said openings, and wherein said ramped surfaces are engaged by said hook-like portions of said resilient projections upon full engagement of said clip members in said openings.

19. The electrical power unit of claim 18, wherein said clip members comprise generally planar portions defining said inner and outer surfaces thereof, and wherein said recessed regions are configured to receive said generally planar portions of said clip members upon engagement of said projections in said openings.

20. The electrical power unit of claim 17, wherein said outer aesthetic surface of said aesthetic cover is substantially flush with said raised perimeter lip.

* * * * *